United States Patent
Harman et al.

(10) Patent No.: US 7,245,768 B1
(45) Date of Patent: Jul. 17, 2007

(54) DEPTH MAP COMPRESSION TECHNIQUE

(75) Inventors: Philip Victor Harman, Scarborough (AU); Andrew Millin, Santa Monica, CA (US)

(73) Assignee: Dynamic Digital Depth Research Pty Ltd., Bentley, W.A. (AU)

( * ) Notice: Subject to any disclaimer, the term of this patent is extended or adjusted under 35 U.S.C. 154(b) by 704 days.

(21) Appl. No.: 10/130,538

(22) PCT Filed: Nov. 17, 2000

(86) PCT No.: PCT/AU00/01402

§ 371 (c)(1),
(2), (4) Date: May 17, 2002

(87) PCT Pub. No.: WO01/39125

PCT Pub. Date: May 31, 2001

(30) Foreign Application Priority Data

Nov. 19, 1999 (AU) .................................. PQ4166

(51) Int. Cl.
*G06K 9/36* (2006.01)

(52) U.S. Cl. ........................ 382/232; 382/236; 382/243

(58) Field of Classification Search ................ 382/232, 382/243, 173, 181, 236; 345/419; 708/203; 348/231.3, 239
See application file for complete search history.

(56) References Cited

U.S. PATENT DOCUMENTS

| | | | |
|---|---|---|---|
| 5,617,334 A | * | 4/1997 | Tseng et al. ................. 708/203 |
| 5,960,118 A | | 9/1999 | Briskin et al. .............. 382/243 |
| 6,104,837 A | | 8/2000 | Walker ........................ 382/239 |

FOREIGN PATENT DOCUMENTS

WO          WO 99/30280 A1     6/1999

OTHER PUBLICATIONS

Ramirez et al., "A Cepstrum-Based Technique for Disparity Detection in a Stereo Vision System" IEEE vol. 1, Aug. 1993, pps. 748-750.*

Inoue et al., "Robot Vision System with a Correlation Chip for Real-Time Tracking, Optical Flow and Depth Map Generation", IEEE vol. 2, May 1992, pps. 1621-1626.*

* cited by examiner

*Primary Examiner*—Anh Hong Do
(74) *Attorney, Agent, or Firm*—Banner & Witcoff, Ltd.

(57) ABSTRACT

A method of compressing depth maps including the steps of determining the boundary of at least one object within a depth map, applying a curve to the boundary of each object, and converting the continuous depth data within an area bounded by the curve into at least one ramp function.

36 Claims, 2 Drawing Sheets

DEPTH MAP COMPRESSION TECHNIQUE

CROSS REFERENCE TO RELATED APPLICATIONS

This is a U.S. National Phase Application under 35 U.S.C. § 371 of International Application No. PCT/AU00/01402 filed Nov. 17, 2000, which was published Under PCT Article 21(2) in English, which claims priority to Australian Application No. PQ4166, filed Nov. 19, 1999, the entire contents of which are incorporated herein by reference.

FIELD OF THE INVENTION

The present invention is directed towards a method of compressing depth maps, and in particular a method of representing depth maps in terms of curves, such as bezier curves, and ramp functions that is well suited for real time, or semi real time processing.

BACKGROUND ART

In converting 2D images into left and right eye images for stereoscopic viewing it is known to create depth maps to assist in the transmission and creation of the 3D image. Generally speaking, the creation of a depth map refers to a technique whereby each object in a scene is allocated a unique attribute (typically a shade of gray) depending upon the relative, or absolute, distance from the object to a reference point, for example the camera lens.

For systems that seek to create stereoscopic images from a 2D image, the creation of this depth map is in most cases, if not all an interim step in this conversion process. The operator, or system, will analyze a 2D image, create a unique depth map, and then finalize the process by creating left and right eye images. Depending on the circumstances, this final process may take place some time after the creation of the depth map.

There presently exists a number of systems which attempt to convert 2D images into stereoscopic images. Whilst each of these systems may effectively create a depth map, the processes of obtaining those depth maps, and similarly, the process by which those depth maps are utilized differ. Further, in order to determine the depths of an object within an image and thereby a depth map, a number of techniques may be used, including the use of multiple cameras, laser range finders, radar imaging, and techniques using modulated radiation sources coupled with reflected radiation intensity detectors.

For example, in the Applicants prior application PCT/AU96/00820, the contents of which are incorporated herein by reference, thee was disclosed a number of techniques, including determining the distance of objects from a camera using variable focus techniques. Alternatively, the use of two cameras and an autocorrelator to determine the distance of objects from a camera was also disclosed.

As a result of these various techniques, the depth maps may be in various formats. The more common formats including, grayscale images, color encoded depth images, or a floating point distance matrix.

Whilst numerous techniques exist to convert 2D images to stereoscopic images, and in the process create depth maps, to date it has not been possible to combine these processes, such that one technique is utilized to create the depth map, and a different technique used to produce the stereoscopic image. That is, merging of the various techniques has not been possible, as existing systems are not able to process a depth map produced by a different process.

The inability to combine processes can lead to the same 2D image being processed by a number of different techniques, thereby producing respective depth maps. The task of analyzing a 2D image for conversion to a depth map can be complicated and in some cases time consuming, and it would be preferable to avoid the need to repeat this task depending on the overall 2D to 3D conversion process selected.

OBJECTS OF THE INVENTION

It is therefore an object of the present invention to provide a method of compressing depth maps, and in particular it is an object of the present invention to provide a relatively simple technique for representing depth maps in terms of curves, such as bezier curves, and ramp functions that is well suited for real time, or semi real time conversion.

SUMMARY OF THE INVENTION

With the above objects in mind, the present invention provides in one aspect a method of compressing depth maps including:
  determining the boundary of at least one object within a depth map;
  applying a curve to the boundary of each said at least one object;
  converting the continuous depth data within an area bounded by said curve into at least one ramp function.

In a further aspect the present invention provides a method of compressing depth maps including the steps of:
  determining the outline of each said at least one object; and
  determining at least one ramp function to represent the depth of each said at least one object;

In the preferred embodiment the curve used will be a bezier curve.

BRIEF DESCRIPTION OF DRAWINGS

To provide a better understanding of the present invention, reference is made to the accompanying drawings, which illustrate a preferred embodiment of the present invention.

In the drawings.

DETAILED DESCRIPTION

The Applicants have in prior applications AU 10884/97, PCT/AU98/01005, and Australian Provisional PR1197, the contents all of which are herein incorporated by reference, disclosed various techniques used in the conversion of 2D images to stereoscopic images. These techniques in part disclosed the creation of depth maps and the encoding of these depth maps. However, these techniques only considered the use of depth maps created as part of the respective process. They did not deal with a depth map created by a different process.

Accordingly, if we assume that a depth map has been created either singularly, or as part of a conversion process, and that depth map has been transmitted, retained or recorded in some way, then the present invention can be adopted to convert the depth map for transmission and/or further processing so as to display stereoscopic images.

Figure 1:
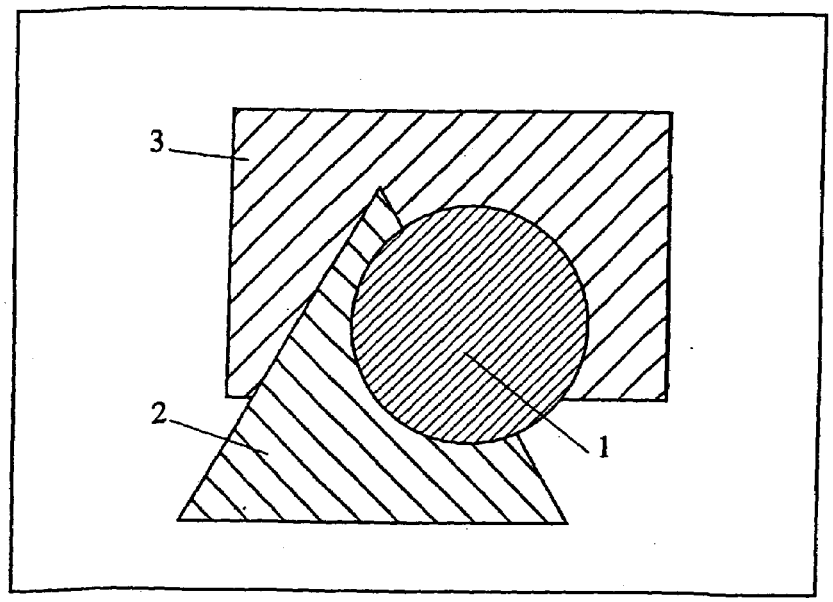
FIG. 1 shows a representation of a depth map depicting three objects.

Referring now to FIG. 1, there is shown by way of example a single video frame of a depth map representative of a 2D image. For purposes of explanation only, assume the video image has been digitized at 800×600 pixels with 8 bits of depth resolution thus allowing a possible 256 discrete depth levels. FIG. 1, as shown, contains three objects, a disk identified as object 1, a triangle identified as object 2 and an oblong identified as object 3. Each of these three objects is located a certain distance from the video camera. This distance is conveniently represented in the depth map by the shape of gray it is colored (shown as cross-hatching in FIG. 1), normally the lighter the gray the closer the object is to the video camera. In this example object 1 is located closest to the camera and has a distance d1 from the viewer, and objects 2 and 3 distance d2 and d3 respectively, with object 3 being located furthest from the camera.

In order to convert the depth map, the objects within the depth map are first identified. That is, in the present example, objects 1, 2 and 3, are each identified as distinct objects. Then, once the objects have been identified, edge detection techniques can be utilized to determine the outline of each object.

FIG. 1 is also illustrative of a depth map produced, for example, in real time, from a range finder. In such cases, whilst humans are capable of seeing the outline of each object, the processor is unable to distinguish what each shape represents. Accordingly, the individual objects will not be known as all we have is a 2D image that represents the depth of each object in the image by a different shade of gray.

Figure 2:
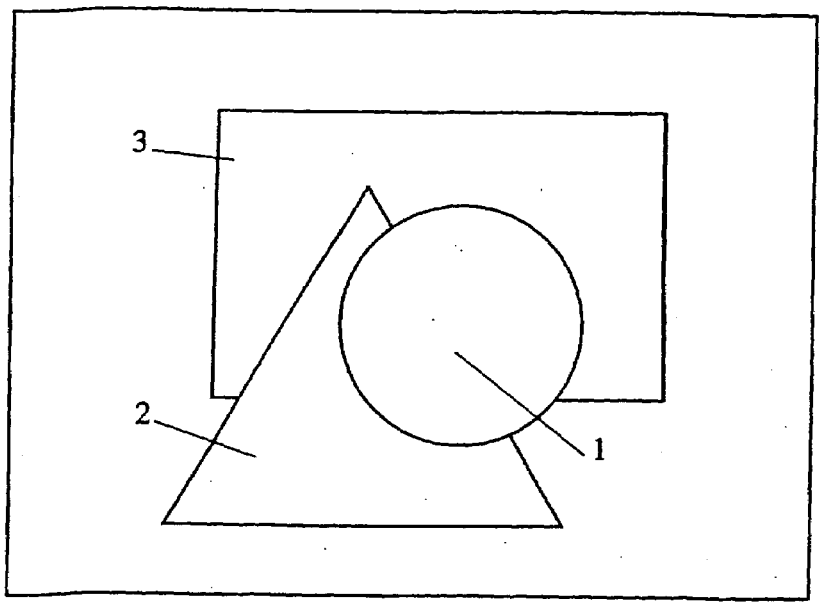
FIG. 2 shows how the edges of the three objects of FIG. 1 may be detected.

In order to determine an object edge, or segment edge, conventional edge detection methods can be applied that will be familiar to those skilled in the art and include, although not limited to, Sobel, Marr-Hildreth, Canny, zero crossing in derivatives and local energy/phase congruency techniques. Using such edge detection techniques the outline of each object can be detected as is illustrated in FIG. 2.

Figure 3:
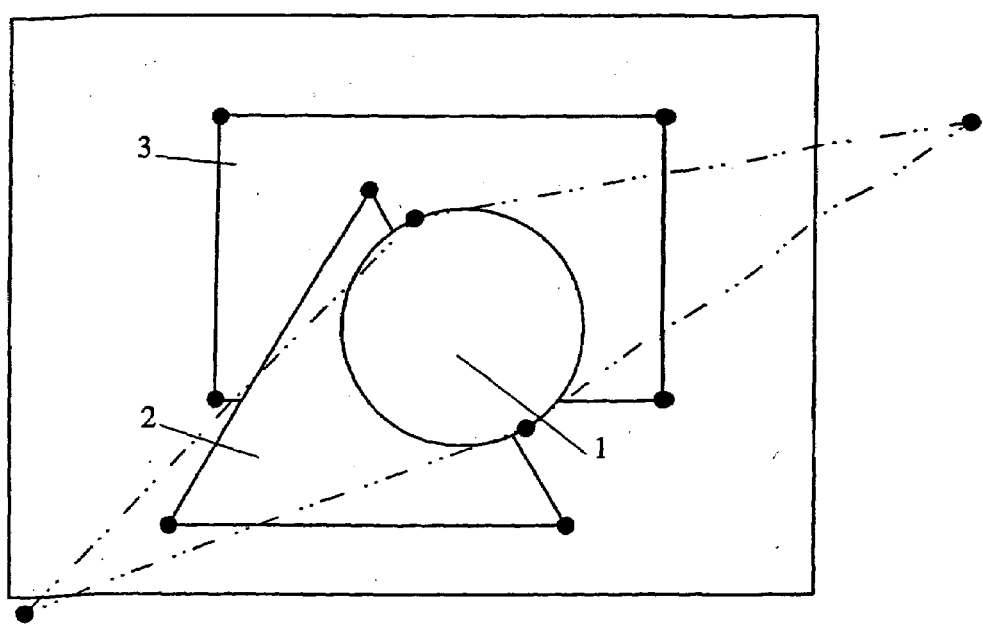
FIG. 3 shows how the outline of the three objects of FIG. 2 may be represented using bezier curves.

Once the outline of each object has been identified, then to aid in further processing it is possible to represent each of the outlines using bezier curves. It will be understood that other curves could also be used, although beziers are preferred due to the amount of data they require to represent the outline of an object. In order to achieve this standard curve matching techniques, known to those skilled in the art, can be applied to the outlines to convert them into bezier curves, as is illustrated in FIG. 3. The application of a bezier curve to the outline of an object within a depth map, which can be applied manually, semi-automatically or automatically, relies on the continuous nature of a depth map. That is, it is assumed that depth varies continuously within any segment of an object.

If there is a depth discontinuity, then an object edge or object segment edge is present. That is, a further object is present, and should be identified as such.

By this process the objects within the depth map are identified and conveniently the boundaries are represented as bezier curves. It is then necessary to account for the various depths of each of the objects.

Once the outline of each object has been determined and represented in a convenient format, preferably bezier curves, it is necessary to represent the continuous depth value within the boundaries by one or a plurality of ramp functions. The Application's have found that ramp functions are a very efficient way of compressing the depth data. For example, rather than store all the points along a linear depth ramp between points A and B as A1, A2, A3, . . . . B, it is possible to set the individual depths at A and B and assume a linear change of depth between the two points. The same approach can be applied for other shapes of depth—in general a mathematical expression that describes the depth function is used rather than the actual depths—thereby forming a highly efficient form of compression. Such ramp functions include, but are not limited to, linear, exponential, square law and radial.

There are a number of methods to select the appropriate ramp functions which will be known to those skilled in the art. Such techniques, applied within the boundaries of each object, could include, fitting selected points of the depth data to the set of ramp functions and minimizing the error values. Alternatively, the ramp functions may be determined by testing for constant areas and zero crossings in the zero, first and second order derivatives of the depth data. This will reveal flat, linear and curved areas respectively.

It is desirable to determine the lowest number of ramp functions that can be used to represent the continuous depth value within the depth. In order to determine the lowest number of ramp functions it is possible to compare the depth function with a library of pre-existing depth functions (linear, radial etc.,) and find a best fit. For example, a least squares fit could be used to determine the most appropriate function in the library.

Since the objects in the depth map can be represented by bezier curves and ramp functions this data may be represented, encoded and compressed using the techniques described in the Applicants previous disclosures PCT/AU98/01005 and PQ1197. In this way depth maps created by various techniques can be converted and utilized to create stereoscopic images without the need to analyze the original 2D image to create a unique depth map.

In the past bezier curves have been used to create a depth map where one has not already existed. However, it has not been considered to convert a depth map to a bezier curve and object depth. By representing a depth map as a series of bezier points and object depths, a very efficient way of compressing a depth map can be addressed. By very efficiently compressing the depth map it can be added into the original 2D image and transmitted along with it. Since it is highly compressed it takes a little extra bandwidth and can thus be transmitted via existing video and Internet systems.

It will be appreciated that the preceding process is well suited to fully automatic implementation in either hardware, software or a combination of both. This would enable live depth maps captured from a suitable device to be converted and encoded in a suitable format in real time for subsequent broadcasting or recording.

It will be appreciated that the preceding process could be undertaken completely manually. In this embodiment, an operator would manually select the outline of each object and describe the bezier curve. Similarly, the operator may select a ramp function from a predetermined library of functions and/or create new ramp functions as required.

It will also be appreciated that a semi automatic process could be implemented whereby the performance of the process is monitored by an operator and assistance is given by the operator if and when the process is unable to automatically determine the outline of an object or select an appropriate ramp function.

In an alternative embodiment, in order to represent the depth within an area bounded by a bezier curve, the ramp function maybe replaced with other methods known to those skilled in the art, which include, but are not limited to, Meshes, Metaballs (Blobs), NURBS (Non Uniform Rational B-Splines), CSG (Constructive Solid Geometry) and TIN's (Triangulated Irregular Networks).

Modifications and variations to the conversion technique of the present invention may be apparent to one skilled in the art upon reading of this disclosure and such modifications and variations form part of the scope of the present invention.

What is claimed is:

1. A method of compressing depth maps including the steps of:
   determining a boundary of at least one object within a depth map;
   applying a curve to the boundary of each said at least one object;
   converting continuous depth data within an area bounded by said curve into at least one ramp function to compress the depth map, wherein the at least one ramp function is a compressed representation of the depth map; and
   storing the compressed representation of the depth map in memory.

2. The method as claimed in claim 1, wherein said curve is a bezier curve.

3. The method as claimed in claim 1, further including checking for depth discontinuities, wherein if a depth discontinuity is detected during said converting, suspending said converting to allow additional boundaries to be determined.

4. The method as claimed in claim 1 further including assigning a depth to each said at least one object.

5. The method of claimed in claim 1, wherein said ramp function is represented by at least one algorithm.

6. The method as claimed in claim 5, wherein said ramp function includes at least one of linear, exponential, square law or radial.

7. The method as claimed in claim 1, wherein said ramp function is selected from a library of preexisting ramp functions.

8. The method as claimed in claim 7, wherein a least squares fit is used to determine the ramp function selected from the library.

9. The method as claimed in claim 1 further including encoding the compressed representation of the depth map.

10. The method as claimed in claim 1, wherein said curve is a bezier curve, and further including checking for depth discontinuities, and if a depth discontinuity is detected during said converting, suspending said converting to allow additional boundaries to be determined.

11. The method as claimed in claim 10 further including assigning a depth to each said at least one object.

12. The method as claimed in claim 9 wherein said encoded compressed representation of the depth map is combined with the depth map or an original image from which the depth map was derived.

13. The method as claimed in claim 12 wherein said ramp function is replaced with meshes, metaballs, NURBS, CSG, or TIN'S.

14. The method as claimed in claim 1 wherein said ramp function is replaced with meshes, metaballs, NURBS, CSG, or TIN'S.

15. A method of compressing depth maps including:
    determining a boundary of at least one object within a depth map;
    applying a bezier curve to the boundary of each said at least one object;
    converting continuous depth data within an area bounded by said curve into at least one ramp function to compress the depth map, wherein said ramp function is represented by at least one algorithm, including at least one of linear, exponential, square law or radial, and wherein the at least one ramp function is a compressed representation of the depth map;
    storing the compressed representation of the depth map in memory;
    checking for any discontinuities, sand if a depth discontinuity is detected, suspending said converting to allow additional boundaries to be determined; and
    assigning a depth to each said at least one object.

16. The method as claimed in claim 15 further including encoding the compressed representation of the depth map.

17. A method of compressing depth maps including:
    determining a boundary of at least one object within a depth map;
    applying a bezier curve to the boundary of each said at least one object;
    converting continuous depth data within an area bounded by said curve into at least one ramp function to compress the depth map, wherein said ramp function is selected from a library of preexisting ramp functions, and a least squares fit is used to determine the ramp function selected from the library, and wherein the at least one ramp function is a compressed representation of the depth map;
    storing the compressed representation of the depth map in memory;
    checking for any discontinuities, and if a depth discontinuity is detected, suspending processing to allow additional boundaries to be determined; and
    assigning a depth to each said at least one object.

18. The method as claimed in claim 17 further including encoding the compressed representation of the depth map.

19. A method of compressing depth maps including:
    identifying at least one object within a depth map;
    determining an outline of each said at least one object; and
    determining at least one ramp function to represent continuous depth data of each said at least one object to compress the depth map, wherein the at least one ramp function is a compressed representation of the depth map; and
    storing the compressed representation of the depth map in memory.

20. The method as claimed in claim 19 further including determining at least one curve to represent said outline.

21. The method as claimed in claim 20, wherein said curve is a bezier curve.

22. The method as claimed in claim 19, further including checking for depth discontinuities, wherein if a depth discontinuity is detected during said determining at least one ramp function, identifying an additional object within the depth map.

23. The method as claimed in claim 19 further including assigning a depth to each said at least one object.

24. The method as claimed in claim 19 wherein said ramp function is represented by at least one algorithm.

25. The method as claimed in claim 24, wherein said at least one algorithm includes at least one of linear, exponential, square law or radial.

26. The method as claimed in claim 19, wherein said ramp function is selected from a library of preexisting ramp functions.

27. The method as claimed in claim 26, wherein a least squares fit is used to determine the ramp function selected from the library.

28. The method as claimed in claim 19 further including encoding the compressed representation of the depth map.

29. The method as claimed in claim 19, wherein said curve is a bezier curve, and further including checking for depth discontinuities, where if a depth discontinuity is detected during said determining the at least one ramp function, identifying an additional object within the depth map.

30. The method as claimed in claim 29 further including assigning a depth to each said at least one object.

31. The method as claimed in claim 28 wherein said encoded compressed representation of the depth map is combined with the depth map or an original image from which the depth map was derived.

32. The method as claimed in claim 31 wherein said ramp function is replaced with meshes, metaballs, NURBS, CSG, or TIN's.

33. A method of compressing depth maps including:
   identifying at least one object within a depth map;
   determining an outline of each said at least one object;
   determining at least one bezier curve to represent said outline;
   identifying any depth discontinuities, and if a depth discontinuity is detected, identifying an additional object within the depth map;
   determining at least one ramp function to represent continuous depth data of each said at least one object to compress the depth map, wherein said ramp function is represented by at least one algorithm including, at least one of linear, exponential, square law or radial, and wherein the at least one ramp function is a compressed representation of the depth map; and
   storing the compressed representation of the depth map in memory.

34. The method as claimed in claim 33 further including encoding the compressed representation of the depth map.

35. A method of compressing depth maps including:
   identifying at least one object within a depth map;
   determining an outline of each said at least one object;
   determining at least one bezier curve to represent said outline;
   identifying any depth discontinuities, and if a depth discontinuity is detected, identifying an additional object within the depth map;
   determining at least one ramp function to represent continuous depth data of each said at least one object to compress the depth map, wherein said ramp function is selected from a library of preexisting ramp functions, and a least squares fit is used to determine the ramp function selected from the library, and wherein the at least one ramp function is a compressed representation of the depth map; and
   storing the compressed representation of the depth map in memory.

36. The method as claimed in claim 35 further including encoding the compressed representation of the depth map.

\* \* \* \* \*

UNITED STATES PATENT AND TRADEMARK OFFICE
CERTIFICATE OF CORRECTION

PATENT NO. : 7,245,768 B1  
APPLICATION NO. : 10/130538  
DATED : July 17, 2007  
INVENTOR(S) : Phillip V. Harman et al.

Page 1 of 1

It is certified that error appears in the above-identified patent and that said Letters Patent is hereby corrected as shown below:

In Claim 15, Column 6, Line 15:
  Please delete "sand" and insert --and--

Signed and Sealed this

First Day of April, 2008

JON W. DUDAS
*Director of the United States Patent and Trademark Office*